United States Patent [19]

Miller et al.

[11] Patent Number: 5,844,139
[45] Date of Patent: Dec. 1, 1998

[54] METHOD AND APPARATUS FOR PROVIDING DYNAMICALLY VARIABLE TIME DELAYS FOR ULTRASOUND BEAMFORMER

[75] Inventors: Steven C. Miller, Pewaukee; Gregory A. Lillegard, Greenfield; Daniel Milon, Milwaukee, all of Wis.

[73] Assignee: General Electric Company, Milwaukee, Wis.

[21] Appl. No.: 774,667

[22] Filed: Dec. 30, 1996

[51] Int. Cl.[6] .............................. G01N 29/06; G01S 7/52; G03B 42/06
[52] U.S. Cl. ................................ 73/602; 73/626; 73/628; 600/444; 600/447; 364/723
[58] Field of Search .............................. 73/602, 620, 625, 73/626, 627, 628; 128/660.01, 660.07, 660.08, 661.01; 364/723; 367/7, 11, 103, 105, 123; 600/443, 444, 447

[56] References Cited

U.S. PATENT DOCUMENTS

| | | | |
|---|---|---|---|
| 5,191,546 | 3/1993 | Green | 364/723 |
| 5,345,426 | 9/1994 | Lipschutz | 367/103 |
| 5,348,013 | 9/1994 | Kanda et al. | 128/660.07 |
| 5,457,996 | 10/1995 | Kondo et al. | 73/625 |
| 5,488,588 | 1/1996 | Engeler et al. | 367/7 |

OTHER PUBLICATIONS

"Signal Processing Handbook", edited by C.H. Chen, Marcel Dekker, Inc., New York and Basel, pp. 421–441.
Dudgeon, D.E., "Fundmentals of Digital Array Processing", Proc. IEEE, vol. 65, No. 6, Jun. 1977, pp. 898–904.
Pridham et al., "A Novel Approach to Digital Beamforming", J. Acoust. Soc. Am., vol. 63, No. 2, Feb. 1978, pp. 425–434.
Leung et al., "State–Space Realizations of Fractional–Step Delay Digital Filters with Applications to Array Beamforming", IEEE Trans. Acoustics, Speech & Signal Processing, vol. ASSP–32, No. 2, Apr. 1984, pp. 371–380.
Schafer et al., "A Digital Signal Processing Approach to Interpolation", Proc. IEEE, vol. 61, Jun. 1973, pp. 692–702.

Primary Examiner—Hezron E. Williams
Assistant Examiner—Rose M. Miller
Attorney, Agent, or Firm—Dennis M. Flaherty; John H. Pilarski

[57] ABSTRACT

A phased array sector scanning ultrasonic system includes a separate receive channel for each respective element in an ultrasonic transducer array. Each receive channel imparts a delay to the echo signal produced by each respective element. The delayed echo signals are summed to form a steered, dynamically focused and dynamically windowed receive beam even when the transmit beam does not emanate from the center of the array. The receiver has a beamformer including a multiplicity of beamformer channels. The beamformer dynamically increases delays to each channel without introducing unwanted discontinuities, by combining and synchronizing a FIFO and an interpolator. The interpolator uses "Wallace tree" adders to accumulate bit-shifted versions of the inputs. The number of additions is less than the number of bits which would be needed to represent equivalent coefficients. This reduces the hardware relative to a conventional implementation which incorporates multipliers with shifts and adds equaling the number of bits in the coefficients.

27 Claims, 6 Drawing Sheets

METHOD AND APPARATUS FOR PROVIDING DYNAMICALLY VARIABLE TIME DELAYS FOR ULTRASOUND BEAMFORMER

FIELD OF THE INVENTION

This invention generally relates to ultrasound imaging systems which form ultrasonic beams by time delay and summation of return signals in a multiplicity of parallel channels. In particular, the invention relates to means for providing the required beamforming delays to channel processing.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focused at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer.

Such scanning comprises a series of measurements in which the steered ultrasonic wave is transmitted, and the reflected ultrasonic wave is received and stored. Typically, transmission and reception are steered in the same direction during each measurement to acquire data from a series of points along an acoustic beam or scan line. The receiver is dynamically focused at a succession of ranges along the scan line as the reflected ultrasonic waves are received.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

Scan lines are defined by their position and angle. The intersection of a beam with the transducer face is referred to as the phase center. The angle of a scan line relative to orthogonal is referred to as the steering angle.

Beamforming delays may be fixed or dynamic. Transmit delays are fixed to provide peak pressure at a particular range. Receive delays are typically dynamic since the peak sensitivity must track the increasing range r of reflections as a function of elapsed time t:

$$r = t\frac{c}{2} \quad (1)$$

where c is the speed of sound in the imaged media. The elapsed time may be quantized by an amount $\tau$, which is equivalent to quantized focal ranges:

$$r = n\tau\frac{c}{2} \quad (2)$$

Figure 1A:
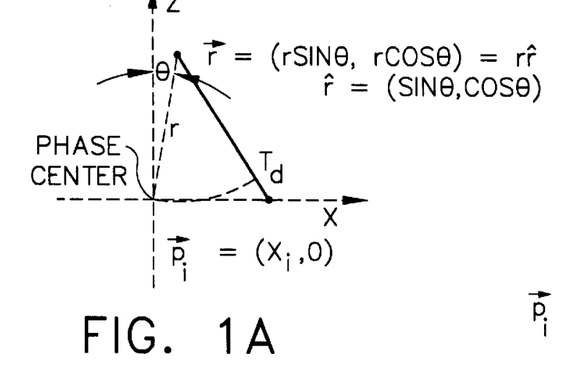
FIGS. 1A and 1B are diagrams showing the beamforming geometry for linear/sector and curved linear transducers respectively.
Figure 1B:
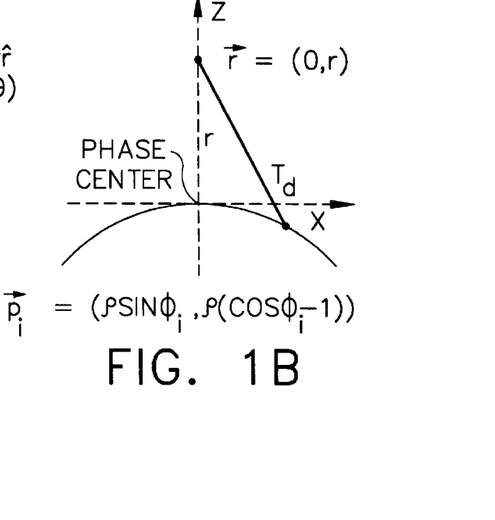

The geometry used herein is shown in FIGS. 1A and 1B for linear/sector and curved linear transducers, respectively. The important reference points are the phase center, focal point and element position. The phase center will always be the origin of the (X,Z) Cartesian coordinate system. The focal point is r and the element position is $p_i$. For curved arrays the element position is determined by the radius of curvature $\rho$ and the channel angle $\Phi_i = l_i\rho$, where $l_i$ is the distance from phase center along the face of the probe.

The beamformer must compensate for channel to channel differences in the propagation time $T_p$ of sound traveling between phase center and $p_i$ via a reflector at r. The relative delay $T_d$ is the difference between the propagation time for channel i and the propagation time for the phase center. For the geometry in FIG. 1A, the times $T_p$ and $T_d$ are as follows:

$$T_d(x_i, \theta, r) = \frac{1}{c}((x_i^2 + r^2 - 2x_i r\sin\theta)^{1/2} - r) \quad (3)$$

$$T_p(x_i, \theta, r) = \frac{1}{c}((x_i^2 + r^2 - 2x_i r\sin\theta)^{1/2} + r) \quad (4)$$

$$T_d(x_i, z_i, r) = \frac{1}{c}([x_i^2 + (r - z_i)^2]^{1/2} - r) \quad (5)$$

$$T_p(x_i, z_i, r) = \frac{1}{c}([x_i^2 + (r - z_i)^2]^{1/2} + r) \quad (6)$$

Figure 2:
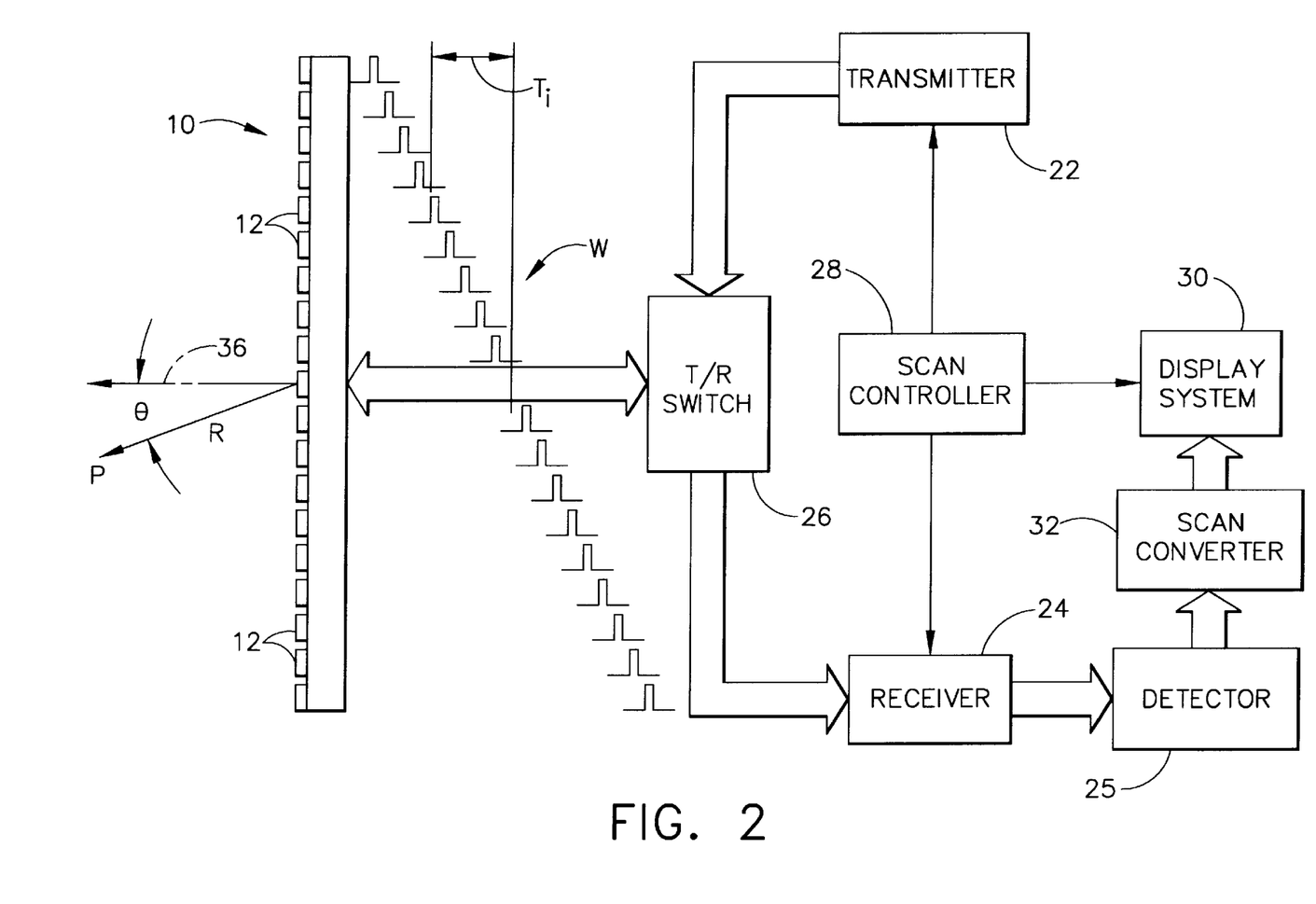
FIG. 2 is a block diagram showing the major functional subsystems within a conventional real-time ultrasound imaging system.

Referring to FIG. 2, a conventional ultrasound imaging system includes a transducer array 10 comprised of a plurality of separately driven transducer elements 12, each of which produces a burst of ultrasonic energy when energized by a pulsed waveform produced by a transmitter 22. The ultrasonic energy reflected back to transducer array 10 from the object under study is converted to an electrical signal by each receiving transducer element 12 and applied separately to a receiver 24 through a set of transmit/receive (T/R) switches 26. The T/R switches 26 are typically diodes which protect the receive electronics from the high voltages generated by the transmit electronics. The transmit signal causes the diodes to shut off or limit the signal to the receiver. Transmitter 22 and receiver 24 are operated under control of a scan controller 28 responsive to commands by a human operator. A complete scan is performed by acquiring a series of echoes in which transmitter 22 is gated ON momentarily to energize each transducer element 12, and the subsequent echo signals produced by each transducer element 12 are applied to receiver 24. A channel may begin reception while another channel is still transmitting. The receiver 24 combines the separate echo signals from each transducer element to produce a single echo signal which is used to produce a line in an image on a display monitor 30.

Transmitter 22 drives transducer array 10 such that the ultrasonic energy produced is directed, or steered, in a beam. To accomplish this, transmitter 22 imparts a time delay to the respective pulsed waveforms W that are applied to successive transducer elements 12 via respective beamformer channels. Each channel has a respective pulser associated therewith. By adjusting the pulse time delays appropriately in a conventional manner, the ultrasonic beam can be directed away from axis 36 by an angle θ and/or focused at a fixed range R. A sector scan is performed by progressively changing the time delays in successive excitations. The angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer element 12 and the magnitude of the echo signal at a particular point in time represents the amount of reflection occurring at a specific range. Due to the differences in the propagation paths between a reflecting point P and each transducer element 12, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle θ.

To simultaneously sum the electrical signals produced by the echoes impinging on each transducer element 12, time delays are introduced into each separate beamformer channels of receiver 24. The beam time delays for reception are the same delays as the transmission delays described above. However, the time delay of each receiver channel is continuously changing during reception of the echo to provide dynamic focusing of the received beam at the range R from which the echo signal emanates.

Under the direction of scan controller 28, receiver 24 provides delays during the scan such that steering of receiver 24 tracks the direction θ of the beam steered by transmitter 22 and provides the proper delays and phase shifts to dynamically focus at points P along the beam. Thus, each transmission of an ultrasonic pulse waveform results in the acquisition of a signal with a magnitude which represents the amount of reflected sound from anatomy located along the ultrasonic beam.

A detector 25 converts the received signal to display data. In the B-mode (greyscale), this would be the envelope of the signal with some additional processing such as edge enhancement and logarithmic compression.

Scan converter/interpolator 32 receives the display data from detector 25 and converts the data into the desired image for display. In particular, the scan converter converts the acoustic image data from polar coordinate (R—θ) sector format or Cartesian coordinate linear array to appropriately scaled Cartesian coordinate display pixel data at the video rate. This scan-converted acoustic data is then output for display on display monitor 30, which images the time-varying amplitude of the envelope of the signal as a grey scale.

Figure 3:
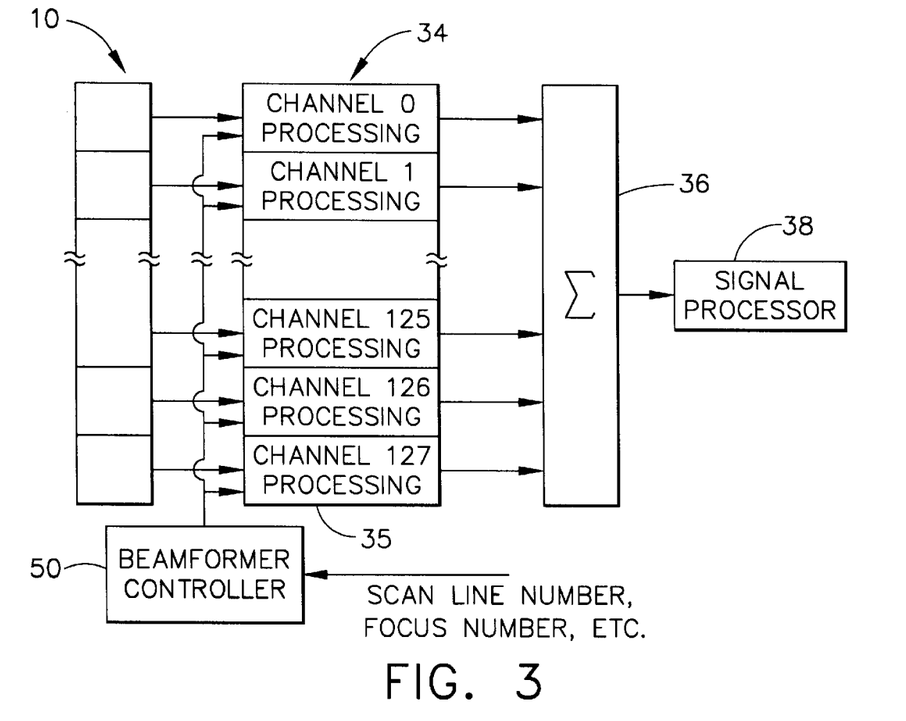
FIG. 3 is a block diagram of a typical 128-channel beamformer for the system depicted in FIG. 2.

Referring to FIG. 3, the receiver comprises a receive beamforming section 34 and a signal processor 38. The receive beamforming section 34 of receiver 24 includes separate beamformer channels 35. Each beamformer channel 35 receives the analog echo signal from a respective transducer element. The beamformer controller 50 converts scan line and transmit focus numbers to addresses into a channel control memory (not shown). The scan controller 28 (FIG. 2) and beamformer controller 50 (FIG. 3) are loaded by the system host CPU in response to user actions such as changing the display format or connecting a different ultrasound probe.

Figure 4:
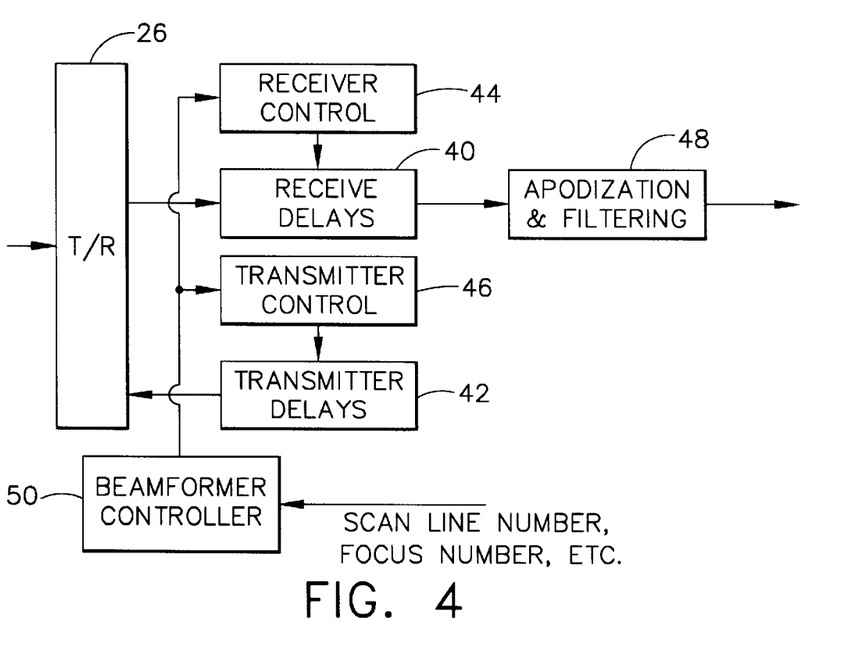
FIG. 4 is a block diagram of the channel processing in the conventional beamformer depicted in FIG. 3.

As seen in FIG. 4, each beamformer channel 35 comprises a receive channel and a transmit channel, each channel incorporating delay means 40 and 42 respectively, which are controlled to provide the needed beamforming delays by receive control logic 44 and transmit control logic 46 respectively. Transmit is typically done by using a counter to delay the start of transmit pulse generation. Some systems may also apply relative phase rotations in addition to, or in place of, delays for receive. The receive channels also have circuitry 48 for apodizing and filtering the receive pulses.

The signals entering the summer 36 (see FIG. 3) have been delayed so that when they are summed with delayed signals from each of the other beamformer channels 35, the summed signals indicate the magnitude and phase of the echo signal reflected from anatomy located along the steered beam (θ). Signal processor 38 receives the beam samples from the summer 36 and produces an output to scan converter 32 (see FIG. 2).

In accordance with the foregoing conventional time-delay digital beamforming system, each signal processing channel 35 comprises an analog-to-digital converter (ADC) and a FIFO which is controlled to provide integer time delays. The ADC and FIFO inputs are driven with asynchronous clocks to produce variable delays. Extra clock cycles are inserted when necessary to increase the FIFO depth. This degrades the performance of the ADCs and presents many implementation difficulties due to timing.

Other prior art digital beamformers interpolate the data to a higher sampler rate before entering the FIFO. This increases the required size of the FIFO.

Yet, other prior art digital beamformers interpolate the output of the FIFO. Dynamic changes in the delay of the FIFO create discontinuities at the input to the interpolator, degrading the interpolator performance.

SUMMARY OF THE INVENTION

The present invention is an apparatus for generating the required beamforming delays for an ultrasound imaging system with minimal hardware and software. In particular, the invention is a method for providing dynamically variable time delays with sub-sample rate precision in an ultrasound beamformer.

Receive beamforming for a high-performance ultrasound imaging system requires time delay precision on the order of 5 nsec. However the receive signal may be fully represented, digitally, with much lower sample periods: such as 40 MHz for a real signal or 10 MHz after demodulation and/or filtering. The present invention provides dynamically variable delays with a precision which is a fraction of the sample period, without increasing the actual sample rate. The fractional delays are provided through the use of an interpolator running at the input sample rate.

To maintain focus during reception, ultrasound beamformer must dynamically increase delays to each channel. The present invention provides the required dynamic delay without introducing unwanted discontinuities, by combining and synchronizing a FIFO and an interpolator.

The preferred embodiment of the interpolator uses "Wallace tree" adders to accumulate bit-shifted versions of the inputs. The number of additions is less than the number of bits which would be needed to represent equivalent coefficients. This reduces the hardware relative to a conventional implementation which incorporates multipliers with shifts and adds equaling the number of bits in the coefficients.

Another feature of the preferred embodiment is that its performance is adequate over the complete range of input frequencies conventionally utilized for medical imaging, while allowing for degradation outside of that frequency range. It does not require modification when the input signal changes frequency. This feature is optional: some embodiments may include frequency-dependent configurations.

DETAILED DESCRIPTION OF THE PREFERRED EMBODIMENTS

Figure 5:
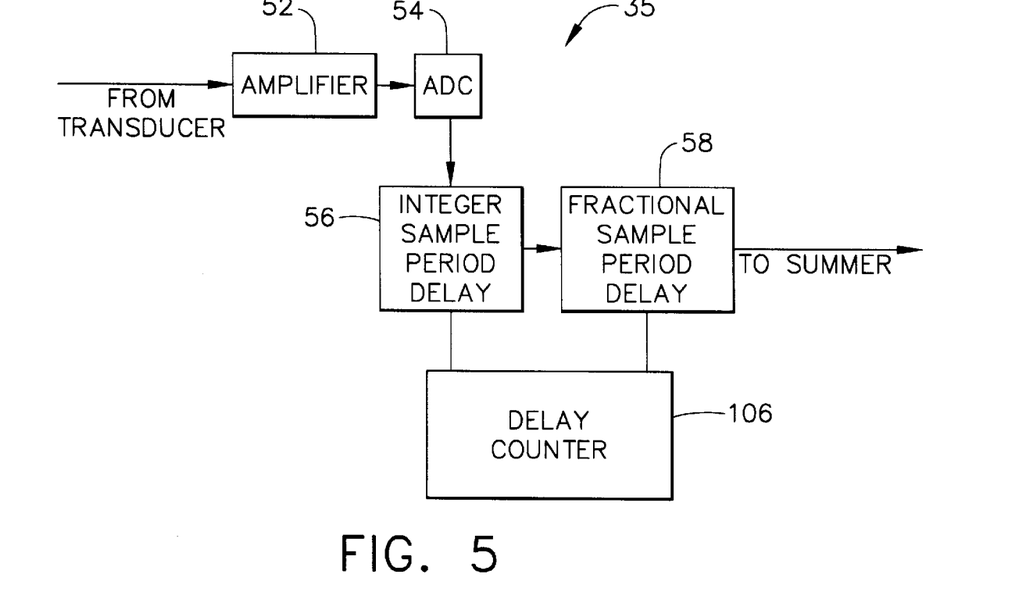
FIG. 5 is a block diagram of a receive signal processing channel in accordance with the present invention.

Referring to FIG. 5, each receive signal processing channel 35 in accordance with the present invention comprises an amplifier 52 which amplifies the signal detected by a respective ultrasound transducer element; an analog-to-digital converter 54 which converts the amplified analog signal into a stream of digital samples at a sampling rate (e.g., each digital sample having 8 bits); an integer sample period delay circuit 56 for delaying the digital samples by a time interval equal to an integer number of sample periods; and a fractional sample period delay circuit 58 for delaying the digital samples by a time interval equal to a fraction of the sample period. The outputs of the respective fractional sample period delay circuits for each processing channel are then summed in the summer 36, shown in FIG. 3.

In accordance with the present invention, the integer sample period delay circuit comprises a dynamic FIFO 101 and a series of clocked pipeline registers 102–105 (see FIG. 8), while the fractional sample period delay circuit comprises an interpolator 107. Parallel receive beamforming could be supported by having multiple read locations from each FIFO. An alternative would be to have separate FIFOs for each receive beam.

In accordance with the broad concept of the invention, the dynamic FIFOs provide range-dependent time delay to support broadband beamforming. The FIFOs support a 40-MHz sample rate providing a "coarse" delay accuracy of ±12.5 nsec. The initial lengths of the FIFOs are controlled by multiple-bit control fields called "initial receive delay". When a delay increment machine (not shown) requests a FIFO delay increment, the FIFO length is increased at the output with a repetition or "hold" of the output sample, i.e., the output data does not change from the previous 40 MHz clock tick.

In accordance with the invention, one interpolator is required for each receive beam. The interpolator provides the "fine" delay adjustment by interpolating between samples from the FIFO. In accordance with one preferred embodiment, the interpolator interpolates between four samples from the FIFO to produce a delay of 2.75, 2.5, 2.25 or 2.0 25-nsec clock periods. This provides a delay accuracy of ±3.125 nsec. The interpolator coefficients in accordance with the preferred embodiment are listed in Table 1.

TABLE 1

| Coefficients | Breakdown |
| --- | --- |
| −20 | −(16 + 4) |
| −31 | −32 + 1 |
| −28 | −32 + 4 |
| 0 | 0 |
| 74 | 64 + 8 + 2 |
| 152 | 128 + 32 − 8 |
| 220 | 256 − 32 − 4 |
| 256 | 256 |
| 220 | 256 − 32 − 4 |
| 152 | 128 + 32 − 8 |
| 74 | 64 + 8 + 2 |
| 0 | 0 |
| −28 | −32 + 4 |
| −31 | −32 + 1 |
| −20 | −(16 + 4) |
| 0 | 0 |

These coefficients are all simple combinations of powers of 2, scaled by 256. To obtain a delay of 2.75, the 1st, 5th, 9th and 13th coefficients are used; to obtain a delay of 2.5, the 2nd, 6th, 10th and 14th coefficients are used; and so on.

The delay counter 106 (see FIG. 8) associated with each beam selects the interpolation coefficients and indicates when a FIFO delay increase is required. When a FIFO delay increase "holds" the FIFO output, the interpolator data must also be held.

An example is shown in Table 2, where each row represents a 40 MHz clock tick. The first column indicates the desired dynamic delay in units of 40 MHz clock ticks, starting in the first row at 5.0. The interpolator provides the fractional portion of this delay, with two additional integer delays. The next four columns are the content of the interpolator input buffers, and the last four columns are the coefficients used. A FIFO delay increment is required in the last row, thus s(25) is held at the output of the FIFO, as well as all the data in the interpolator input buffer.

TABLE 2

| Time | Delay | Interpolator Input Buffer | | | | Interpolator Coefficients | | | |
|---|---|---|---|---|---|---|---|---|---|
| 10.0 | 5.0 | s(6) | s(5) | s(4) | s(3) | 0 | 256 | 0 | 0 |
| 11.0 | 5.0 | s(7) | s(6) | s(5) | s(4) | 0 | 256 | 0 | 0 |
| 12.0 | 5.0 | s(8) | s(7) | s(6) | s(5) | 0 | 256 | 0 | 0 |
| 13.0 | 5.0 | s(9) | s(8) | s(7) | s(6) | 0 | 256 | 0 | 0 |
| 14.0 | 5.25 | s(10) | s(9) | s(8) | s(7) | −28 | 220 | 74 | −20 |
| 15.0 | 5.25 | s(11) | s(10) | s(9) | s(8) | −28 | 220 | 74 | −20 |
| 16.0 | 5.25 | s(12) | s(11) | s(10) | s(9) | −28 | 220 | 74 | −20 |
| 17.0 | 5.25 | s(13) | s(12) | s(11) | s(10) | −28 | 220 | 74 | −20 |
| 18.0 | 5.5 | s(14) | s(13) | s(12) | s(11) | −31 | 152 | 152 | −31 |
| 19.0 | 5.5 | s(15) | s(14) | s(13) | s(12) | −31 | 152 | 152 | −31 |
| 20.0 | 5.5 | s(16) | s(15) | s(14) | s(13) | −31 | 152 | 152 | −31 |
| 21.0 | 5.5 | s(17) | s(16) | s(15) | s(14) | −31 | 152 | 152 | −31 |
| 22.0 | 5.5 | s(18) | s(17) | s(16) | s(15) | −31 | 152 | 152 | −31 |
| 23.0 | 5.5 | s(19) | s(18) | s(17) | s(16) | −31 | 152 | 1S2 | −31 |
| 24.0 | 5.5 | s(20) | s(19) | s(18) | s(17) | −31 | 152 | 152 | −31 |
| 25.0 | 5.5 | s(21) | s(20) | s(19) | s(18) | −31 | 152 | 152 | −31 |
| 26.0 | 5.75 | s(22) | s(21) | s(20) | s(19) | −20 | 74 | 220 | −28 |
| 27.0 | 5.75 | s(23) | s(22) | s(21) | s(20) | −20 | 74 | 220 | −28 |
| 28.0 | 5.75 | s(24) | s(23) | s(22) | s(21) | −20 | 74 | 220 | −28 |
| 29.0 | 5.75 | s(25) | s(24) | s(23) | s(22) | −20 | 74 | 220 | −28 |
| 30.0 | 6.0 | s(25) | s(24) | s(23) | s(22) | 9 | 256 | 0 | 0 |
| 31.0 | 6.0 | s(26) | s(25) | s(24) | s(23) | 0 | 256 | 0 | 0 |

Interpolation is equivalent to applying a linear time-invariant filter to a zero-filled signal. The zero-filled signal represents the sampled input signal with zeros between the known sample values. The spectrum of the zero-filled, sampled signal has high-frequency images of the input spectrum at harmonics of the sample rate. The interpolation filter passes the spectrum of the input signal while attenuating all the images. These images are above the array design frequency as determined by the interelement spacing. Thus, they produce grating lobes. The relative level of these grating lobes is determined by the stopbands of the interpolation filter around the sample rate harmonics.

Figure 6:
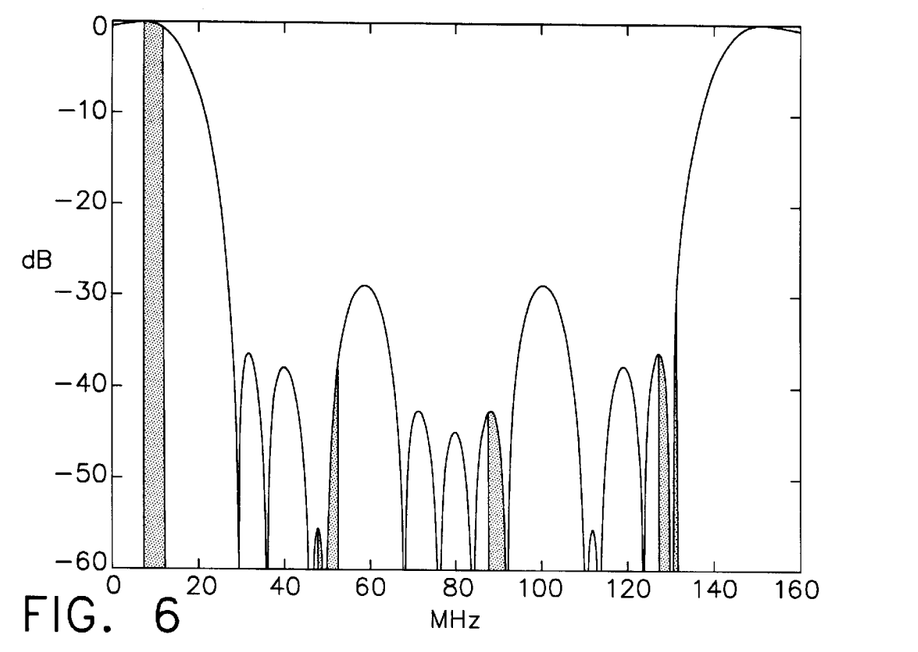
FIG. 6 is a graph showing the four-point cubic interpolation frequency response of an interpolation filter in accordance with the invention.

The filter coefficients for this design are listed in Table 1. The frequency response of this interpolation filter is shown in FIG. 6. It has a −3 dB passband to greater than 13 MHz, and −35 dB stopbands around 40, 80, and 120 MHz, each 26 MHz wide. Thus a CW signal would have grating lobes at −35 dB in the worst case. The grating lobes of a typical signal are much lower. A worst case example would be a 20-cycle PW Doppler burst on a 40-channel aperture. The first grating lobe will be attenuated an additional −6 dB, making the overall level less than −40 dB.

Figure 7A:
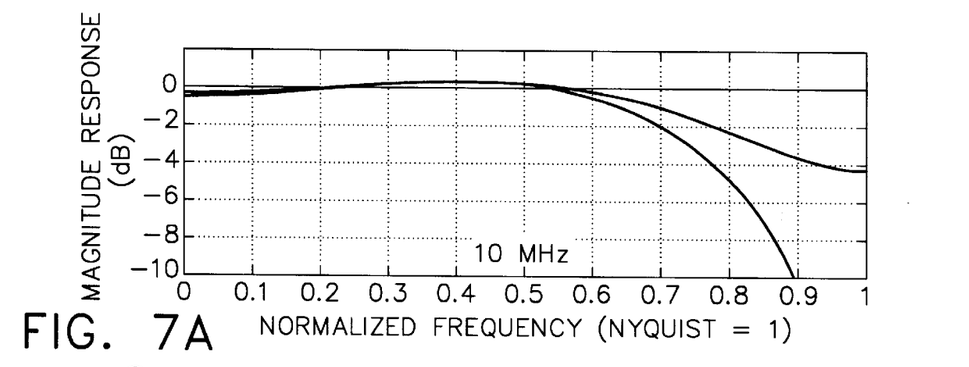
FIGS. 7A and 7B are graphs showing the magnitude response and group delay, respectively, for an interpolation filter in accordance with the invention.
Figure 7B:
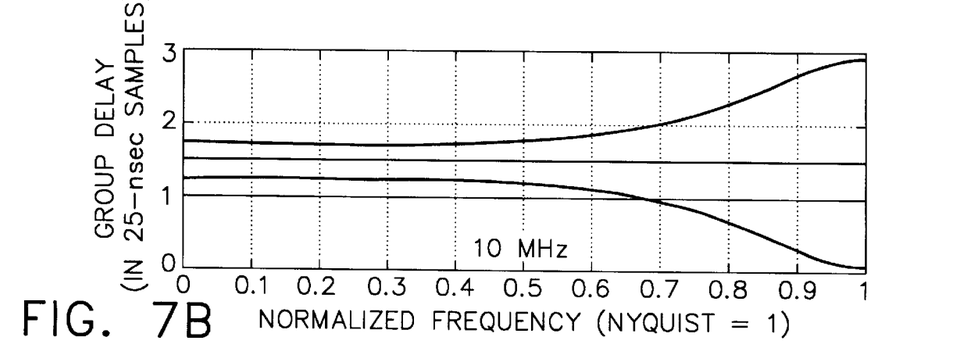

Another way to look at the interpolator is as a selection of all-pass filters with different group delays. This approach may be more intuitive since it is closer to the actual implementation. In this design, four coefficients are applied according to the desired fractional delay. Since there are four fractional delays available, there are four sets of four coefficients, each with an associated group delay and magnitude response. FIGS. 7A and 7B shows the responses for the coefficients listed in Table 1. The magnitude response is flat to ±0.5 dB out to 13 MHz, and the group delay is correct to within 3.25 nsec out to 13 MHz. While this approach provides insight into the resulting accuracy, it does not lead to an estimate of beamforming performance (i.e. grating lobe levels), as directly as the first approach. Compared to cordic rotation or linear interpolation, this approach provides better performance and/or less hardware in all modes.

Figure 8:
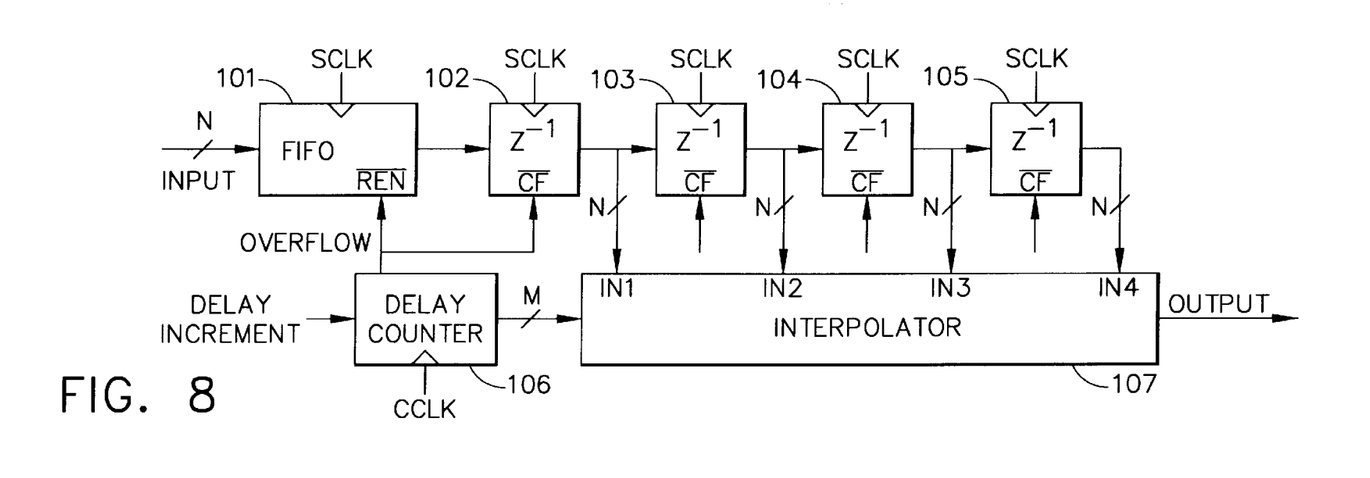
FIG. 8 is a block diagram showing the dynamic beamforming delay logic in accordance with the preferred embodiment of the invention.

In accordance with a preferred embodiment of the invention shown in FIG. 8, dynamic beamforming delays are provided by FIFO 101, pipeline registers 102–105, and interpolator 107. The FIFO 101 provides delays that are an integer number of sample clock (SCLK) periods. Registers 102 and 103, provide an additional delay of two sample periods, to IN2, the nominal center input of the interpolator 107. The interpolator 107 provides an additional fractional delay between the center two (IN2 and IN3) input samples. Although a four-sample interpolator is shown, the invention may be generalized to use Q input samples from Q registers, where Q is an integer equal to 2 or more. The input registers would then provide Q/2 sample periods of delay, while the interpolator interpolated between the center two inputs.

Figure 9:
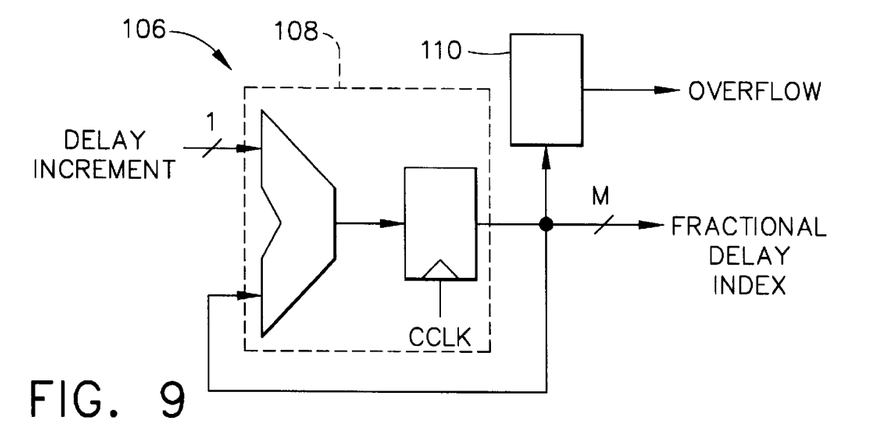
FIG. 9 is a block diagram showing the delay control logic incorporated in the dynamic beamforming delay logic depicted in FIG. 8.

The dynamic beamforming delay logic shown in FIG. 8 has a delay counter 106 which controls FIFO 101, registers 102–105, and interpolator 107 in a synchronous manner. The overall delay may be increased in response to a "Delay Increment" signal from a delay increment machine (not shown), at each tick of a control clock (CCLK). The delay counter 106, shown in FIG. 9, outputs a fractional delay index and an overflow bit. In the general case where the interpolator 107 provides a selection of L fractional delays from 0 to (L−1)/L sample periods, then the index is M=log₂L bits. Each time CCLK ticks with "Delay Increment" set, the delay counter accumulator 108 increments to select the next fractional delay. When overflowing from (L−1) to 0, the overflow logic 110 sets the overflow bit for one SCLK period to disable reading the FIFO 101 via REN and clocking the registers via CE. REN stops the read of the FIFO while continuing to write, producing an extra sample of FIFO delay per SCLK tick. One SCLK tick of REN increases the FIFO delay one sample period. CE holds the contents on the interpolator input registers to keep them synchronized with the FIFO output, with the nearest four samples to the desired output. This happens simultaneously with the interpolator delay switching from (L−1)/L to 0 fractional delay, producing the desired net increase of 1/L fractional delays without discontinuity. This is illustrated in Table 2.

To meet practical timing constraints, CCLK must have the proper relationship to SCLK. The CCLK trigger edge must occur early enough to allow the REN and CE control inputs to setup before the SCLK trigger edge. In general, the CCLK may run at a slower rate than the SCLK. The CCLK frequency $f_c$ only needs to be high enough to keep up with the rate that the beamforming delays must change over range.

A good approximation is:

$$f_c > \frac{L f_s}{16 f_n^2} \left(1 - \frac{1}{2 f_n} \tan\theta \right)^{-2} \qquad (7)$$

where $f_s$ is the SCLK frequency, $f_n$ is the minimum receive f-number, and $\theta$ is the maximum steering angle relative to broadside. A system which has a minimum receive f-number of 1.5, a maximum steering angle of 45 degrees, a sample rate of 40 MHz, and an interpolation ratio L of 4, requires a 10 MHz control clock.

Figure 10:
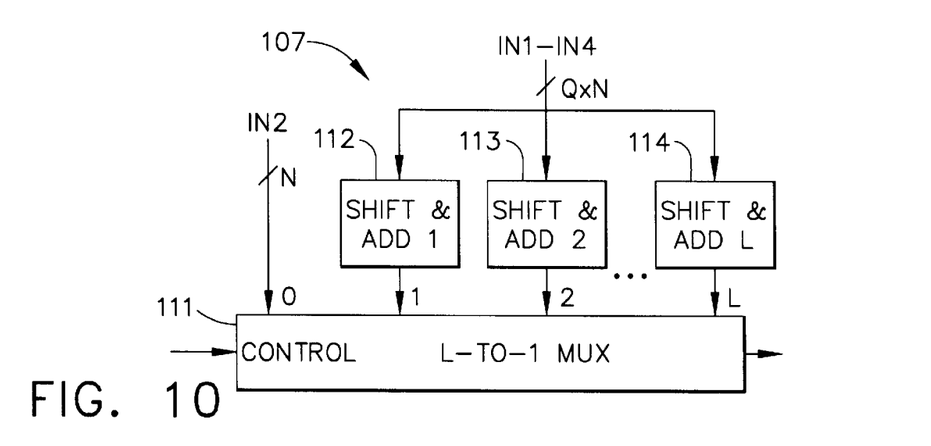
FIG. 10 is a block diagram showing the interpolator incorporated in the dynamic beamforming delay logic depicted in FIG. 8 in accordance with one preferred embodiment of the invention.

The interpolator may be a conventional interpolator such as described in the prior art; however, the preferred embodiment is shown in FIG. 10. A multiplexer 111 selects one of the L fractional delays according to the index from delay counter 106 (see FIG. 8). If the index is zero, the sample from the second (Q/2) input register is passed to the output directly. Otherwise, the output of one of (L−1) shift and add blocks 112 through 114 is used.

Figure 11:
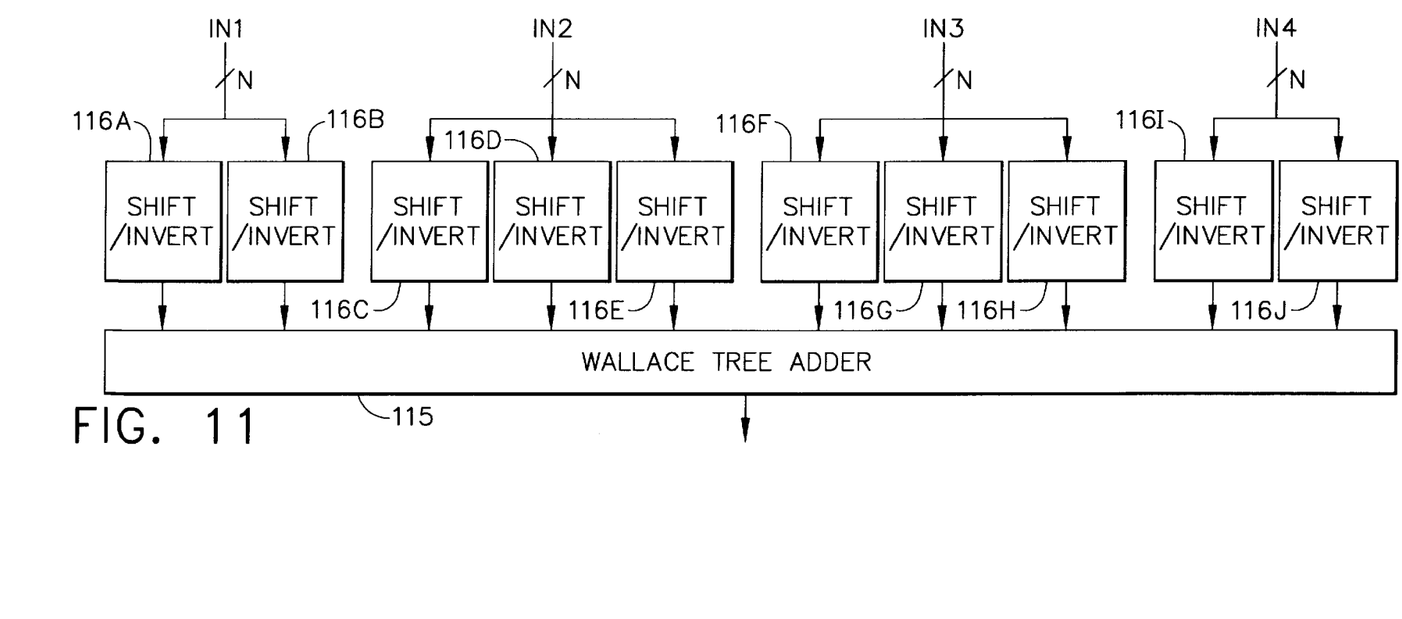
FIG. 11 is a block diagram showing further details of a representative shift and add block incorporated in the interpolator depicted in FIG. 10.

An advantage of the foregoing method is that no multipliers are needed; only shifts, inversions and one Wallace tree adder are needed per shift and add block (see FIG. 11). The bit shifters require no control or active circuitry; the shifts are simply performed by shifting the bit connections. Inversion is very simple, and a Wallace tree adder is the must efficient VLSI design for adding many values. In the preferred embodiment shown in FIG. 11, the first input sample is shifted/inverted in two ways in respective blocks 116A, 116B; the second input sample is shifted/inverted in three ways in respective blocks 116C–116E; the third input sample is shifted/inverted in three ways in respective blocks 116F–116H; and the fourth input sample is shifted/inverted in two ways in respective blocks 116I, 116J. For example, to obtain a delay of 2.75, the 1st, 5th, 9th and 13th coefficients listed in Table 1 are broken down and used as follows: input IN1 to shift/invert block 116A is shifted by 4 bits and inverted (i.e., equivalent to multiplication by −16); input IN1 to shift/invert block 116B is shifted by 2 bits and inverted (i.e., equivalent to multiplication by −4); input IN2 to shift/invert block 116C is shifted by 6 bits (i.e., equivalent to multiplication by 64); input IN2 to shift/invert block 116D is shifted by 3 bits (i.e., equivalent to multiplication by 8); input IN2 to shift/invert block 116E is shifted by 1 bit (i.e., equivalent to multiplication by 2); input IN3 to shift/invert block 116F is shifted by 8 bits (i.e., equivalent to multiplication by 256); input IN3 to shift/invert block 116G is shifted by 5 bits and inverted (i.e., equivalent to multiplication by −32); input IN3 to shift/invert block 116H is shifted by 2 bits and inverted (i.e., equivalent to multiplication by −4); input IN4 to shift/invert block 116I is shifted by 6 bits and inverted (i.e., equivalent to multiplication by −32); and input IN4 to shift/invert block 116J is shifted by 2 bits (i.e., equivalent to multiplication by 4). All shifted/inverted samples are then supplied to a Wallace tree adder 115 for summing, e.g., −20(IN1)+74(IN2)+220(IN3)−28 (IN4). This is equivalent to interpolating with coefficients that are limited to the sum or difference of two or three powers of 2, i.e., $\pm 2^{shift}$. More powers of two can be used for better performance.

Figure 12:
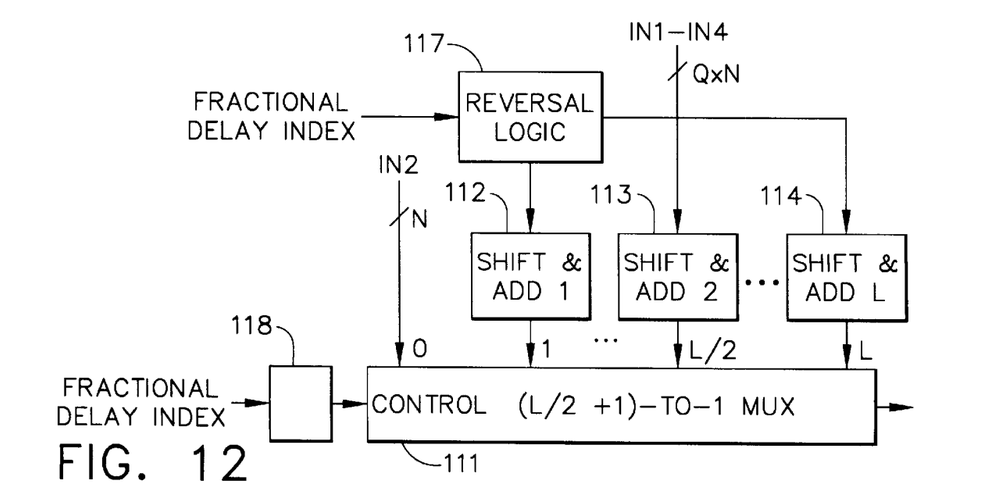
FIG. 12 is a block diagram showing the interpolator incorporated in the dynamic beamforming delay logic depicted in FIG. 8 in accordance with another preferred embodiment of the invention.

An alternate approach takes advantage of the symmetry of the interpolation coefficients. Coefficients for the i/L fractional delay are just reversed in order from coefficients for the (L−i)/L delay, where i<L/2. Thus, for the L=Q=4 example, when the fractional delay index is greater than 2, reversal logic 117 can reverse IN1, IN2, IN3 and IN4, to connect to the Shift and Add IN4, IN3, IN2, and IN1 inputs, respectively. Multiplexer control logic 118 outputs index L/2−i, when the fractional delay index i is greater than L/2, and just passes i otherwise.

Proper selection of the shifts and inversions, i.e., coefficients, can provide adequate performance across the entire ultrasound imaging band.

The foregoing preferred embodiments have been disclosed for the purpose of illustration. Variations and modifications will be readily apparent to those skilled in the art of beamforming for ultrasound imaging. All such variations and modifications are intended to be encompassed by the claims set forth hereinafter.

We claim:

1. A beamforming channel comprising analog-to-digital conversion means for outputting digital samples at a sampling rate, an integer sampling period delay circuit having an input coupled to receive said digital samples and having an output, a fractional sampling period delay circuit having an input coupled to receive said digital samples from said integer sampling period delay circuit and having an output, and a delay control circuit coupled to said integer sampling period delay circuit and to said fractional sampling period delay circuit for outputting delay signals which dynamically synchronously control the amount by which said integer sampling period delay circuit and said fractional sampling period delay circuit will respectively delay a signal passing therethrough, wherein said integer sampling period delay circuit comprises a FIFO having an input coupled to receive said digital samples and having an output, and a first register having an input coupled to said output of said FIFO and having an output, said fractional sampling period delay circuit comprises an interpolator having a first input coupled to said output of said first register and said delay control circuit comprises means for holding the contents of said first register to keep said output of said first register synchronized with said output of said FIFO following a change in the amount of delay provided by said FIFO.

2. The beamformer channel as defined in claim 1, further comprising a second register having an input coupled to said output of said first register and having an output, wherein said interpolator has a second input coupled to said output of said second register and said delay control circuit comprising means for holding the contents of said second register to keep said output of said second register synchronized with said output of said FIFO following said change in the amount of delay provided by said FIFO.

3. The beamformer channel as defined in claim 2, further comprising a third register having an input coupled to said output of said second register and having an output, and a fourth register having an input coupled to said output of said third register and having an output, wherein said interpolator has third and fourth inputs respectively coupled to said outputs of said third and fourth registers, and said delay control circuit comprising means for holding the contents of said third and fourth registers to keep said outputs of said third and fourth registers synchronized with said output of said FIFO following said change in the amount of delay provided by said FIFO.

4. The beamformer channel as defined in claim 2, wherein said interpolator outputs an interpolated digital sample which is a function of first and second digital samples received from said first and second registers respectively.

5. The beamformer channel as defined in claim 2, wherein said interpolator comprises:

first means for shifting and inverting said first and second digital samples from said first and second registers in accordance with a first set of interpolation coefficients to produce a first multiplicity of shifted and inverted digital samples which are dependent on the results of shifting and inverting said first and second digital samples from said first and second registers in accordance with said first set of interpolation coefficients;

a first adder coupled to receive and add said first multiplicity of shifted and inverted digital samples to produce a first interpolated digital sample;

second means for shifting and inverting said first and second digital samples from said first and second registers in accordance with a second set of interpolation coefficients to produce a second multiplicity of shifted and inverted digital samples which are dependent on the results of shifting and inverting said first and second digital samples from said first and second registers in accordance with said second set of interpolation coefficients;

a second adder coupled to receive and add said second multiplicity of shifted and inverted digital samples to produce a second interpolated digital sample; and a multiplexer having first and second inputs respectively coupled to receive said first and second interpolated digital samples, said multiplexer outputting one of said first and second interpolated digital samples in response to a control signal from said delay control circuit.

6. The beamformer channel as defined in claim 5, wherein each of said first and second adders is a Wallace tree adder.

7. The beamformer channel as defined in claim 2, wherein said interpolator comprises:

first and second bit shift and invert circuits respectively coupled to receive said first and second digital samples from said first and second registers, each of said first and second bit shift and invert circuits having an output;

a first adder having first and second inputs coupled to said outputs of said first and second bit shift and invert circuits respectively and having an output; and a multiplexer having a first input coupled to said output of said first adder.

8. The beamformer channel as defined in claim 7, wherein said interpolator further comprises:

third and fourth bit shift and invert circuits respectively coupled to receive said first and second digital samples from said first and second registers, each of said third and fourth bit shift and invert circuits having an output; and a second adder having first and second inputs coupled to said outputs of said third and fourth bit shift and invert circuits respectively and having an output, wherein said multiplexer has a second input coupled to said output of said second adder.

9. The beamformer channel as defined in claim 8, wherein each of said first and second adders is a Wallace tree adder.

10. A beamformer comprising a multiplicity of beamformer channels and a summer having a multiplicity of inputs respectively coupled to said multiplicity of beamformer channels, wherein each of said beamformer channels comprises:

analog-to-digital conversion means for outputting digital samples at a sampling rate;

an integer sampling period delay circuit having an input coupled to receive said digital samples and having an output;

a fractional sampling period delay circuit having an input coupled to receive said digital samples from said integer sampling period delay circuit and having an output coupled to a respective input of said summer; and a delay control circuit coupled to said integer sampling period delay circuit and to said fractional sampling period delay circuit for outputting delay signals which dynamically synchronously control the amount by which said integer sampling period delay circuit and said fractional sampling period delay circuit will respectively delay a signal passing therethrough, wherein said integer sampling period delay circuit comprises a FIFO having an input coupled to receive said digital samples and having an output, and a first register having an input coupled to said output of said FIFO and having an output, said fractional sampling period delay circuit comprises an interpolator having a first input coupled to said output of said first register and said delay control circuit comprises means for holding the contents of said first register to keep said output of said first register synchronized with said output of said FIFO following a change in the amount of delay provided by said FIFO.

11. The beamformer as defined in claim 10, wherein each of said beamformer channels further comprises a second register having an input coupled to said output of said first register and having an output, wherein said interpolator has a second input coupled to said output of said second register and said delay control circuit comprising means for holding the contents of said second register to keep said output of said second register synchronized with said output of said FIFO following said change in the amount of delay provided by said FIFO.

12. The beamformer as defined in claim 11, wherein each of said beamformer channels further comprises a third register having an input coupled to said output of said second register and having an output, and a fourth register having an input coupled to said output of said third register and having an output, wherein said interpolator has third and fourth inputs respectively coupled to said outputs of said third and fourth registers, and said delay control circuit comprising means for holding the contents of said third and fourth registers to keep said outputs of said third and fourth registers synchronized with said output of said FIFO following said change in the amount of delay provided by said FIFO.

13. The beamformer as defined in claim 12, wherein said interpolator outputs an interpolated digital sample which is a function of first through fourth digital samples received from said first through fourth registers respectively.

14. The beamformer as defined in claim 12, wherein said interpolator comprises:

first means for shifting and inverting said first and second digital samples from said first and second registers in accordance with a first set of interpolation coefficients to produce a first multiplicity of shifted and inverted digital samples which are dependent on the results of shifting and inverting said first and second digital samples from said first and second registers in accordance with said first set of interpolation coefficients;

a first adder coupled to receive and add said first multiplicity of shifted and inverted digital samples to produce a first interpolated digital sample;

second means for shifting and inverting said first and second digital samples from said first and second registers in accordance with a second set of interpolation coefficients to produce a second multiplicity of shifted and inverted digital samples which are dependent on the results of shifting and inverting said first and second digital samples from said first and second registers in accordance with said second set of interpolation coefficients;

a second adder coupled to receive and add said second multiplicity of shifted and inverted digital samples to produce a second interpolated digital sample; and a multiplexer having first and second inputs respectively coupled to receive said first and second interpolated digital samples, said multiplexer outputting one of said first and second interpolated digital samples in response to a control signal from said delay control circuit.

15. The beamformer as defined in claim 14, wherein each of said first and second adders is a Wallace tree adder.

16. The beamformer as defined in claim 12, wherein said interpolator comprises:

first and second bit shift and invert circuits respectively coupled to receive said first and second digital samples from said first and second registers, each of said first and second bit shift and invert circuits having an output;

a first adder having first and second inputs coupled to said outputs of said first and second bit shift and invert circuits respectively and having an output; and a multiplexer having a first input coupled to said output of said first adder.

17. The beamformer as defined in claim 16, wherein said interpolator further comprises:

third and fourth bit shift and invert circuits respectively coupled to receive said first and second digital samples from said first and second registers, each of said third and fourth bit shift and invert circuits having an output; and a second adder having first and second inputs coupled to said outputs of said third and fourth bit shift and invert circuits respectively and having an output, wherein said multiplexer has a second input coupled to said output of said second adder.

18. The beamformer as defined in claim 17, wherein each of said first and second adders is a Wallace tree adder.

19. An ultrasonic imaging system comprising a transducer array, a beamformer coupled to said transducer array, a signal processor coupled to said beamformer, a scan converter coupled to said signal processor, and a display monitor coupled to said scan converter, wherein said transducer array comprises a multiplicity of transducer elements and said beamformer comprises a multiplicity of beamformer channels, switching circuitry for selectively coupling said beamformer channels to said transducer elements, and summing means having a multiplicity of inputs respectively coupled to said multiplicity of beamformer channels, wherein each of said beamformer channels comprises:

analog-to-digital conversion means for outputting digital samples at a sampling rate;

an integer sampling period delay circuit having an input coupled to receive said digital samples and having an output;

a fractional sampling period delay circuit having an input coupled to receive said digital samples from said integer sampling period delay circuit and having an output coupled to a respective input of said summer; and a delay control circuit coupled to said integer sampling period delay circuit and to said fractional sampling period delay circuit for outputting delay signals which dynamically synchronously control the amount by which said integer sampling period delay circuit and said fractional sampling period delay circuit will respectively delay a signal passing therethrough, wherein said integer sampling period delay circuit comprises a FIFO having an input coupled to receive said digital samples and having an output, a first register having an input coupled to said output of said FIFO and having an output, and a second register having an input coupled to said output of said first register and having an output, said fractional sampling period delay circuit comprises an interpolator having first and second inputs respectively coupled to said outputs of said first and second registers, and said delay control circuit comprises means for holding the contents of said first and second registers to keep said outputs of said first and second registers synchronized with said output of said FIFO following a change in the amount of delay provided by said FIFO.

20. The ultrasonic imaging system as defined in claim 19, wherein said interpolator comprises:

first means for shifting and inverting said first and second digital samples from said first and second registers in accordance with a first set of interpolation coefficients to produce a first multiplicity of shifted and inverted digital samples which are dependent on the results of shifting and inverting said first and second digital samples from said first and second registers in accordance with said first set of interpolation coefficients;

a first adder coupled to receive and add said first multiplicity of shifted and inverted digital samples to produce a first interpolated digital sample;

second means for shifting and inverting said first and second digital samples from said first and second registers in accordance with a second set of interpolation coefficients to produce a second multiplicity of shifted and inverted digital samples which are dependent on the results of shifting and inverting said first and second digital samples from said first and second registers in accordance with said second set of interpolation coefficients;

a second adder coupled to receive and add said second multiplicity of shifted and inverted digital samples to produce a second interpolated digital sample; and a multiplexer having first and second inputs respectively coupled to receive said first and second interpolated digital samples, said multiplexer outputting one of said first and second interpolated digital samples in response to a control signal from said delay control circuit.

21. A method of generating a time-delayed digital sample in an ultrasound beamformer corresponding to a digital sample having a time delay which is a fraction of a sampling period, comprising the steps of:

acquiring first and second digital samples of an ultrasound receive signal in first and second sampling periods;

bit shifting and inverting said first and second digital samples in accordance with a first set of interpolation coefficients to produce a first multiplicity of bit shifted and inverted digital samples which are dependent on the results of shifting and inverting said first and second digital samples from said first and second registers in accordance with said first set of interpolation coefficients;

adding said first multiplicity of bit shifted and inverted digital samples to produce a first interpolated digital sample;

bit shifting and inverting said first through fourth digital samples in accordance with a second set of interpolation coefficients to produce a second multiplicity of bit shifted and inverted digital samples which are dependent on the results of shifting and inverting said first and second digital samples from said first and second registers in accordance with said second set of interpolation coefficients;

adding said second multiplicity of bit shifted and inverted digital samples to produce a second interpolated digital sample; and multiplexing one of said first and second interpolated digital samples to an output.

22. A beamforming channel comprising:

analog-to-digital conversion means for outputting digital samples at a sampling rate;

a FIFO having an input coupled to receive said digital samples and having an output;

first through N-th registers connected in series, said first register having an input coupled to said output of said FIFO and having an output, and said N-th register having an input and an output;

an interpolator having first through N-th inputs respectively coupled to said outputs of said first through N-th registers; and a delay control circuit coupled to said FIFO, to said first through N-th registers and to said interpolator for outputting delay signals which dynamically synchronously control the amount of delay of a signal passing through said FIFO, said registers and said interpolator, wherein said delay control circuit comprises means for holding the contents of said first through N-th registers to keep said outputs of said first through N-th registers synchronized with said output of said FIFO following a change in the amount of delay provided by said FIFO.

23. The beamformer channel as defined in claim 22, wherein said interpolator comprises:

first interpolation means for generating a first interpolated digital sample as a function of outputs from said first through N-th registers into in accordance with a first set of interpolation coefficients;

second interpolation means for converting the outputs of said first through N-th registers into a second interpolated digital sample in accordance with a second set of interpolation coefficients; and a multiplexer having first and second inputs respectively coupled to receive said first and second interpolated digital samples, said multiplexer outputting one of said first and second interpolated digital samples in response to a control signal from said delay control circuit.

24. The beamformer channel as defined in claim 22, wherein said first interpolation means comprises means for bit shifting the output of said first register as a function of a first interpolation coefficient of said first set of interpolation coefficients.

25. The beamformer channel as defined in claim 24, wherein said first interpolation means further comprises means for inverting said bit-shifted output of said first register as a function of said first interpolation coefficient of said first set of interpolation coefficients.

26. The beamformer channel as defined in claim 22, wherein said first interpolation means comprises:

means for bit shifting the outputs of said first through N-th registers as a function of said first set of interpolation coefficients;

means for inverting at least some of said bit-shifted outputs as a function of said first set of interpolation coefficients to produce a plurality of values; and means for adding said values to produce said first interpolated digital sample.

27. The beamformer channel as defined in claim 26, wherein said adding means comprises a Wallace tree adder.

* * * * *